H. E. DOERR.
RAIL JOINT.
APPLICATION FILED JUNE 8, 1921.
1,393,764. Patented Oct. 18, 1921.
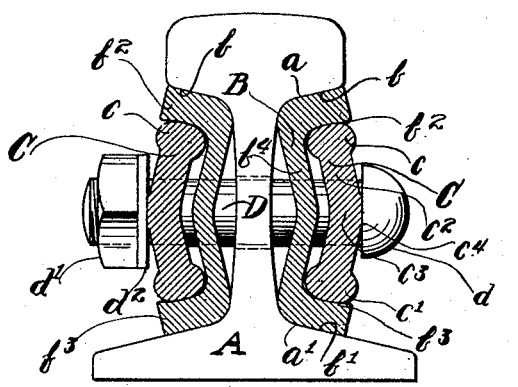
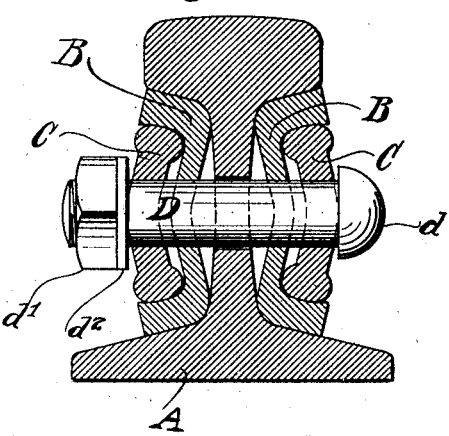
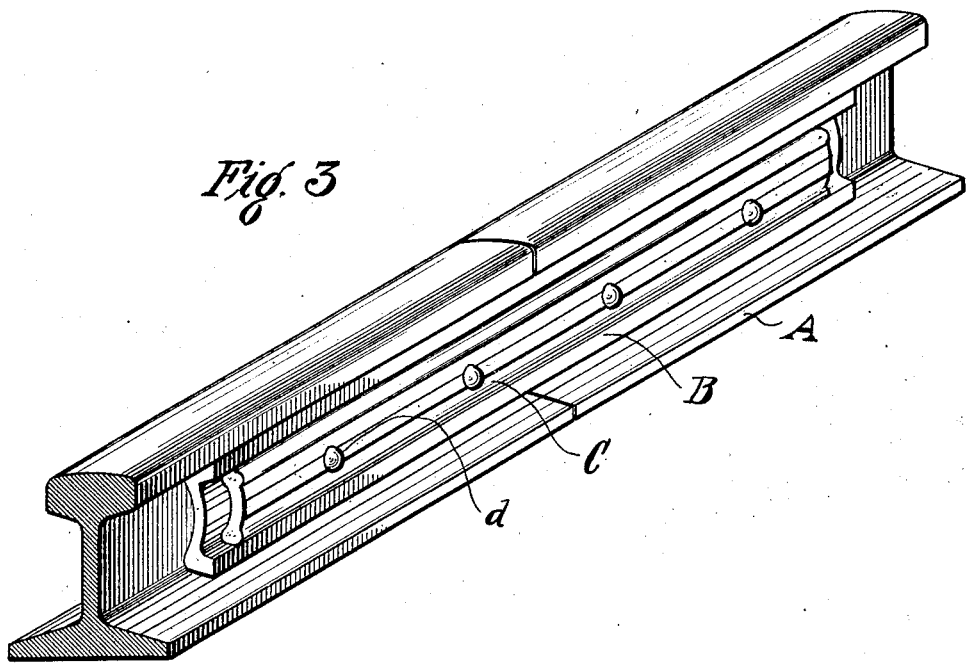
Witness
J. L. Brown
Inventor
Harry E. Doerr
By Wilkinson, Huxley, Byron & Knight
Attys.

UNITED STATES PATENT OFFICE.

HARRY E. DOERR, OF ST. LOUIS, MISSOURI, ASSIGNOR TO SCULLIN STEEL CO., OF ST. LOUIS, MISSOURI, A CORPORATION OF MISSOURI.

RAIL-JOINT.

1,393,764.   Specification of Letters Patent.   Patented Oct. 18, 1921.

Application filed June 8, 1921. Serial No. 475,869.

*To all whom it may concern:*

Be it known that I, HARRY E. DOERR, a citizen of the United States, residing at St. Louis, in the county of St. Louis and State of Missouri, have invented certain new and useful Improvements in Rail-Joints, of which the following is a specification.

This invention relates to splicing joints for rails, and is designed primarily for use in railroad rails although it may be used for splicing other rails which are required to sustain loads, and which are provided with opposed fishing surfaces to receive fish plates or splice bars for sustaining the abutting ends of the rails under the imposed load.

One object of the invention is to provide a joint in which the splicing members may assume permanent and accurately conforming seats against the fishing surfaces, and in addition to being pressed firmly inward or laterally will be pressed vertically against the fishing surfaces by extending the vertical dimension of the splicing members and without distorting their marginal portions through which they bear against the fishing surfaces or disturbing the distribution of contact throughout said surfaces.

Another object is to provide a splice joint in which a separately formed expanding member may be made to coöperate with the splicing member to extend the latter without impairing the distribution of bearing of the expander against the splicing member and in a manner to impose the greater portion of the splice load upon the expander.

Still another object is to provide a splice joint in which the splicing member is tightened against the fishing surfaces by a toggle-like expander which takes on a new permanent set in developing its toggle action, and reduces to a minimum the tendency of springing or developing reverse toggle action under the vertical load which it assumes.

Finally, an object of the invention is to develop a toggle-like splice joint for rails in which the parts are left under sufficient resiliency to serve as an efficient lock for the nut upon the securing bolt.

The preferred embodiment of means whereby the several objects above enumerated may be realized, is illustrated in the accompanying drawings, in which—

Figure 1 is a transverse section of the splice joint in the plane of the meeting ends of the rails to be secured.

Fig. 2 is a sectional view in the plane of one of the securing bolts; and

Fig. 3 is a perspective view of the splice joint.

A, A, represent two standard railroad rails to be spliced. B represents splice bars having upper and lower marginal surfaces $b$, $b'$ which conform accurately to the upper and lower fishing surfaces $a$, $a'$ of the rails A, or bear such relation thereto that the splicing members may reach the substantial limit of their inward or lateral seating movement when the splicing member is first applied, since the operative principle of the present invention does not necessarily involve inward wedging movement under the bolting action to develop the firm seating of the splicing members against the fishing surfaces. The splicing members B are constructed with outwardly presented marginal flanges $b^2$, $b^3$ through which their seating area against the fishing surfaces is materially enlarged, and the heads thus provided are connected by a transversely arched body portion or web $b^4$ which meets the heads at their inner margins, and which adapts the splicing members to be extended vertically by the partial straightening or flattening of the arch.

C represents toggle-like expanders constructed with heads $c$, $c'$, and a body $c^2$ which is arched in the same direction as the web $b^4$. The heads $c$, $c'$ are fitted to opposed bearing faces formed upon the flanges $b^2$, $b^3$ of the splicing members and are preferably enlarged transversely to develop effective load-sustaining bearings.

D represents bolts of the joint, which pass through the expanders C, splicing members B, and rails A. The heads $d$ and nuts $d'$ with their interposed washers $d^2$ on bolts D develop their pressure upon the crests of the arches of the expanders C through the medium of the flat faces $c^4$ which are preferably of restricted vertical dimension and limited to the sides of the bolt openings of the expanders lying in the longitudinal axis of the expanders so that when the nuts are tightened up the arched body portions $c^2$ of the expanders are flattened and the heads $c$, $c'$ driven apart and caused to force the bearing margins of the splice members B into close seating against the fishing surfaces. The surfaces through which the heads $c$, $c'$ of the expanders C meet the flanges $b^2$, $b^3$ of the splicing members are constructed upon arcs having their centers approximately in the horizontal plane of the crest of the arches of the expanders or the horizontal plane of the axes of the securing bolts so that in developing toggle action in the expanders C by flattening their arches under the pressure of the bolts, the heads $c$, $c'$ roll upon the flanges $b^2$, $b^3$ instead of sliding thereon and a true toggle action is developed, with the advantage of avoiding any disturbance in the distribution of bearing pressure throughout the area of the meeting surfaces, and consequent maintenance of tight bearing throughout the meeting areas of the surfaces $a$ and $b$. The depth of arching of the expanders C is preferably such as to bring the center of the arcuate meeting surfaces of parts $b^2$, $c$, $c'$, $b^3$ within the plane of the outer marginal extremities of the heads $c$, $c'$, so that the tendency of the toggle expander to develop reverse toggle action under the vertical load imposed upon the expander is greatly reduced.

In the preferred construction, the toggle-like expanders may take on a permanent set under the bolting action but will still have sufficient inherent resiliency to maintain a substantial longitudinal stress upon the bolt that will materially assist in resisting unscrewing action of the nuts under vibration.

Web $b^4$ of the splicing members may be of considerably less sectional dimension than the body of the expander as it will be largely relieved of vertical load by the expander C.

I am aware of the fact that it has been proposed to provide a splicing plate with an arched web adapted to be flattened by the action of the bolts applied directly thereto, but this arrangement is objectionable in that the flattening of the arch tends to change the angle of the bearing faces of the splice member and destroys proper bearing against the fishing surfaces. I am also aware that it has been proposed to employ reinforcing splice members fitted between outwardly presented flanges of a main splicing member in a manner to develop wedging action by the sliding of the auxiliary member upon the main splicing member. But this is not the equivalent of my invention for several substantial reasons, chief among which are the fact that the distribution of seating pressure changes with the sliding action of the auxiliary member, and the wedging action has not the resiliency that is obtainable with a toggle action; moreover, there is a distinct tendency of the wedging faces to separate or reduce pressure at certain points as a result of reduction in the chamber of the auxiliary member.

While I have described in detail the design of the preferred embodiment of my invention, the scope of my invention is to be ascertained not from the detailed description but from the sub-joined claims. For instance, since the arching of the web of the splice member is primarily for the purpose of developing a fullness of metal that will permit the heads of the splice member to enlarge their distance apart, it will be within the purview of my invention if this feature of arching were displaced by several transverse deflections of less amplitude and analogous to longitudinally extending corrugations; and since the purpose of arching the expander and arcing its bearing surfaces against the spliced member is to develope a true toggle action, it would be within the scope of my invention to localize the flexure of the toggle-like expander along lines above and below the bolt bearing, and to locate the centers of its upper and lower bearing arcs in these respective lines instead of at a common point in the medial line of the expander. Moreover, the actuate surfaces through which the expander and splice member meet might be convex on the splice member and concave on the expander.

It is also to be understood that while the several elements of the invention are designed for conjoint action, the splicing members and toggle-like expanders may constitute separate articles of manufacture, and therefore the several elements are claimed individually as well as in combination.

I claim:

1. A splice bar for rail joints constructed with upper and lower bearing heads having faces through which they seat against the fishing surfaces of a rail, with a vertically extensible web connecting said heads, and with opposed arcuate expander seats on the sides of said heads opposite their seating faces.

2. A splice plate for rail joints constructed with upper and lower bearing heads adapted to seat against the fishing surfaces of a rail, with a web connecting said heads, outwardly arched to permit the heads to enlarge their distance apart by the lessening of the arch of the web, and with opposed arcuate expander seats on said heads.

3. A splice plate for rail joints constructed with a web and outwardly presented flanges upon its longitudinal margins, providing upper and lower bearing heads; said web being deflected from a vertical plane to provide fullness of metal permitting vertical enlargement of the space between the heads; and said heads having surfaces through which they seat inwardly and vertically against fishing surfaces of rails to be joined, and having upon opposed faces, provided by said flanges, arcuate rocking bearings for an expander.

4. A splice bar for rails constructed with a web and heads upon its upper and lower longitudinal margins protruding laterally beyond the web; said web being transversely arched to permit it to enlarge the distance between its heads; and said heads having the opposed faces of their protruding portions constructed on arcs that afford a rocking bearing for an expander.

5. As an article of manufacture, a toggle-expander for rail joints comprising rocking heads and an arched connecting body.

6. As an article of manufacture, a toggle-expander for rail joints comprising rocking heads and an arched body connecting said heads; the heads being provided with longitudinally extending cylindrical bearing faces.

7. As an article of manufacture, a toggle-expander for rail joints comprising rocking heads and an arched body connecting said heads; the heads being provided with longitudinally extending cylindrical bearing faces constructed about a center located within the body and in the longitudinal plane of the crest of the arch.

8. A toggle-expander for extensible splice plates for rails, comprising rocking heads and a transversely arched body connecting said heads, and having a bolt opening through the crest of the arch, with a bolt head seat adjacent said opening.

9. A toggle-expander for extensible splice plates for rails, comprising rocking heads and a transversely arched body connecting said heads, and having a bolt opening through the crest of the arch, with a bolt head seat adjacent said opening; the rocking heads having longitudinally extending cylindrical seating faces constructed on arcs whose center lies in the plane of the axis of the bolt opening.

10. A toggle-expander for extensible splice plates for rails, comprising rocking heads and a transversely arched body connecting said heads, and having a bolt opening through the crest of the arch, with a bolt head seat adjacent said opening; the rocking heads having longitudinally extending cylindrical seating faces constructed on arcs whose center lies in the plane of the axis of the bolt opening and within the vertical plane of the bolt head seat.

11. As an article of manufacture, a toggle-expander for rail joints comprising rocking heads and an arched connecting body; the heads being of greater thickness than the body and being thereby adapted to space the body from an arched member against which the heads seat and permit the flattening of the arch without contact of the body.

12. In a rail joint, a vertically extensive fish plate and a toggle plate expander having rocking bearings against said fish plate.

13. In a rail joint, a vertically extensible fish plate constructed with outwardly presented flanges providing opposed bearing faces, and a toggle plate expander having rocking heads impinging against said bearing faces.

14. In a rail joint, a splice bar having a longitudinally continuing transversely arched web and marginal flanges extending in the direction of the height of the arch, and an expander plate arched in the same direction as the splice bar and bearing against the flanges thereof through cylindrical surfaces that permit toggle action of the expander and consequent vertical pressure therefrom while transmitting inward pressure to the splice bar.

Signed at St. Louis, Missouri, this 1st day of June, 1921.

HARRY E. DOERR.